US011033832B1

(12) United States Patent
    McKellar

(10) Patent No.: US 11,033,832 B1
(45) Date of Patent: Jun. 15, 2021

(54) CONVERTIBLE LABORATORY CONDENSER

(71) Applicant: Bernard Robert McKellar, Dallas, TX (US)

(72) Inventor: Bernard Robert McKellar, Dallas, TX (US)

(*) Notice: Subject to any disclaimer, the term of this patent is extended or adjusted under 35 U.S.C. 154(b) by 0 days.

(21) Appl. No.: 16/659,993

(22) Filed: Oct. 22, 2019

Related U.S. Application Data

(60) Provisional application No. 62/748,950, filed on Oct. 22, 2018.

(51) Int. Cl.
    *B01D 5/00* (2006.01)
(52) U.S. Cl.
    CPC ......... *B01D 5/0063* (2013.01); *B01D 5/0009* (2013.01); *B01D 5/009* (2013.01); *B01D 5/0012* (2013.01); *B01D 5/0033* (2013.01)
(58) Field of Classification Search
    CPC .. B01D 5/0009; B01D 5/0012; B01D 5/0033; B01D 5/0063; B01D 5/009
    See application file for complete search history.

(56) References Cited

U.S. PATENT DOCUMENTS

| | | | | | |
|---|---|---|---|---|---|
| 2,575,688 A | * | 11/1951 | Smith | ............... | B01D 3/085 202/153 |
| 2,701,789 A | * | 2/1955 | White | ............... | B01D 3/4205 202/161 |
| 3,607,662 A | * | 9/1971 | Glover | ............... | B01D 5/0045 202/160 |
| 3,812,010 A | * | 5/1974 | Nitsch | ............... | C13K 3/00 435/94 |
| 5,398,806 A | * | 3/1995 | Quinn | ............... | B01D 3/00 202/152 |
| 6,419,796 B1 | * | 7/2002 | Kitamura | ............... | B01D 3/14 202/153 |
| 6,911,119 B2 | * | 6/2005 | Babu | ............... | B01D 11/0296 202/83 |
| 7,150,807 B2 | * | 12/2006 | Genser | ............... | B01D 3/085 159/6.1 |
| 10,549,212 B2 | * | 2/2020 | Kremerman | ............... | B01D 5/0006 |

* cited by examiner

*Primary Examiner* — Jonathan Miller
(74) *Attorney, Agent, or Firm* — Ice Miller LLP

(57) ABSTRACT

The present invention is a laboratory condenser adapted to be interchangeable from functioning as a reflux condenser to functioning as a distillation condenser as by inversion, and related methods of reflux and distillation that may be carried out by its use.

14 Claims, 6 Drawing Sheets

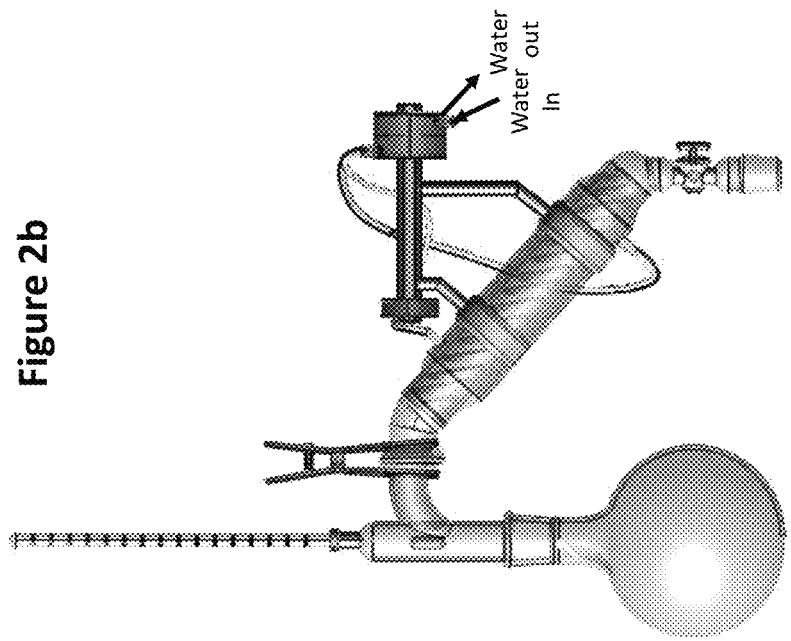
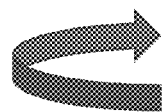
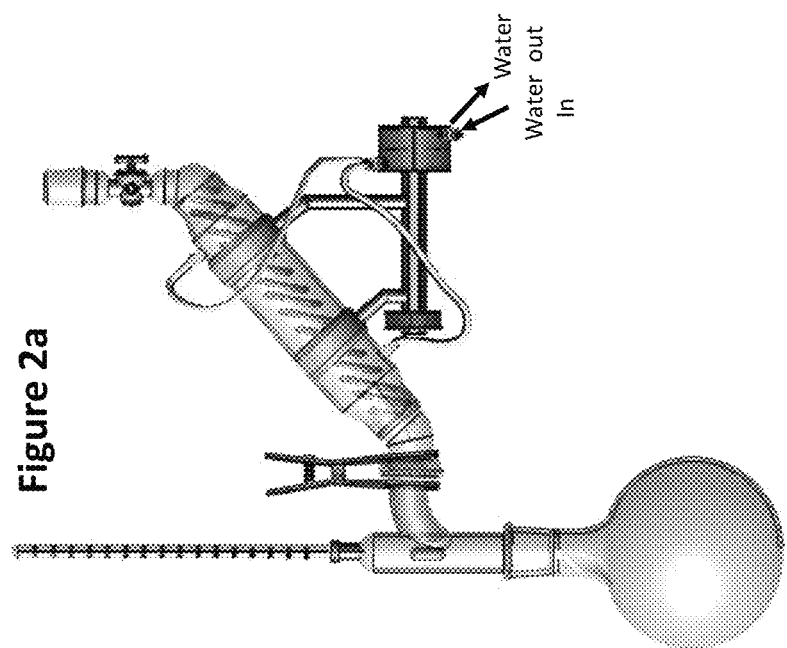

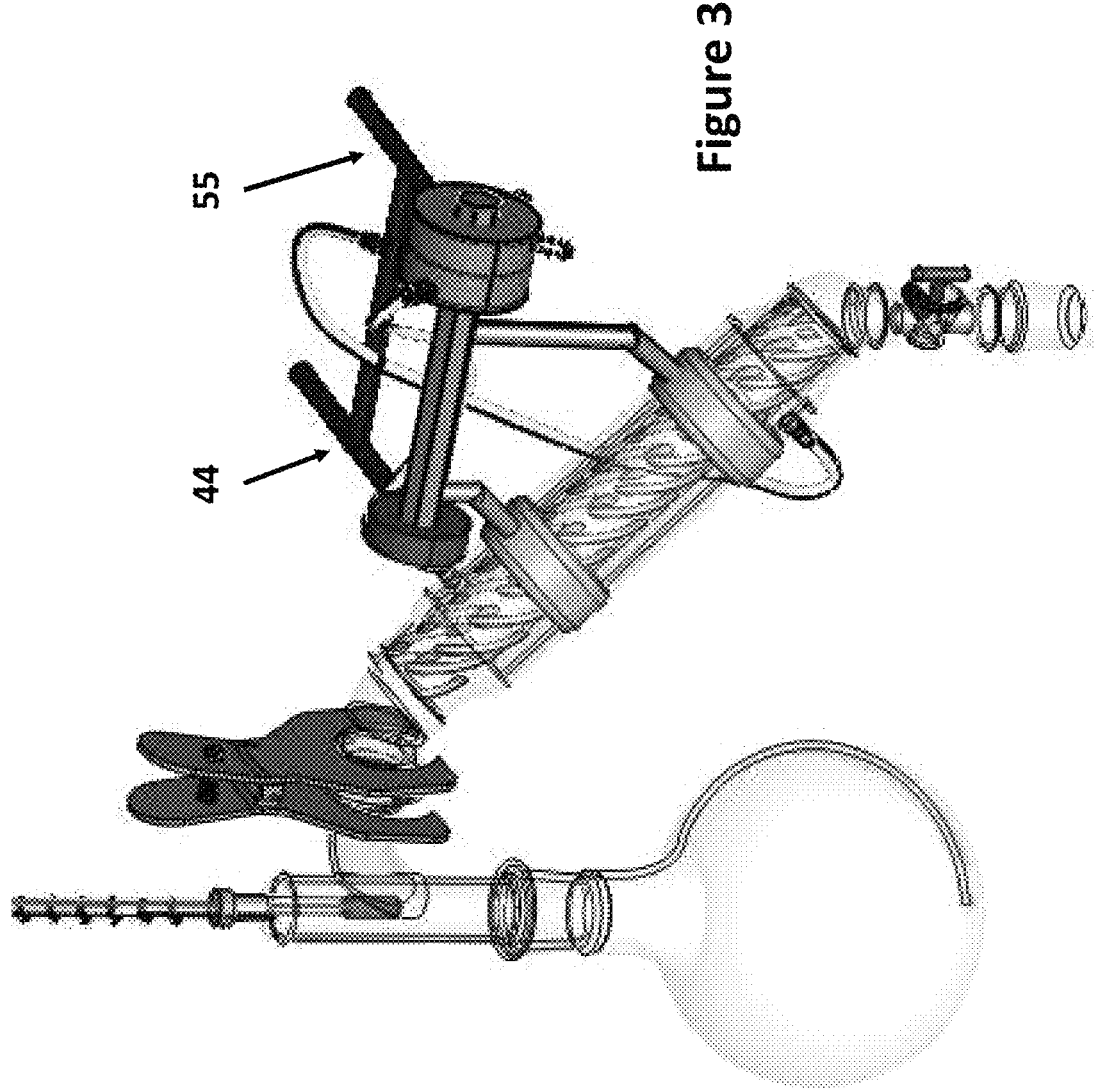

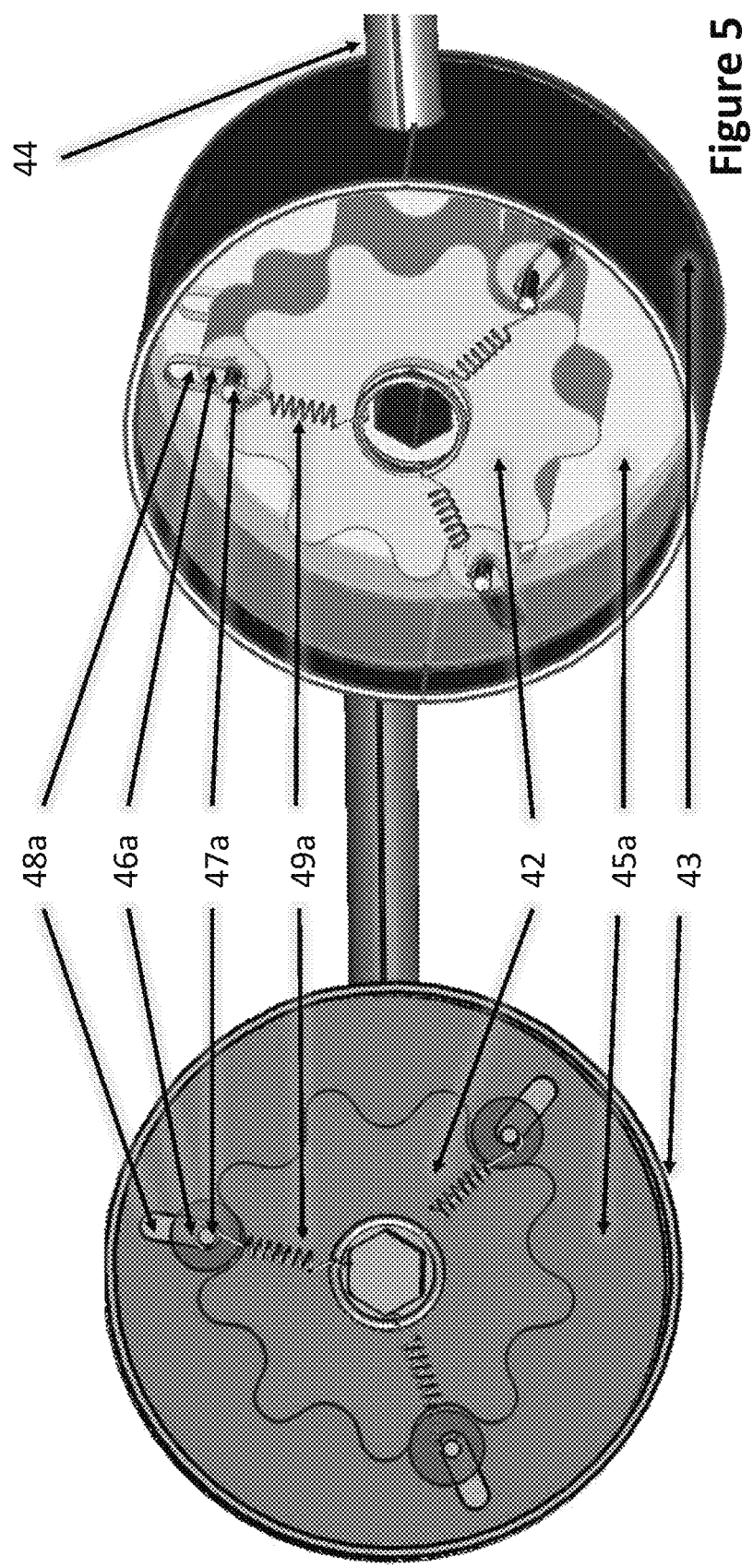

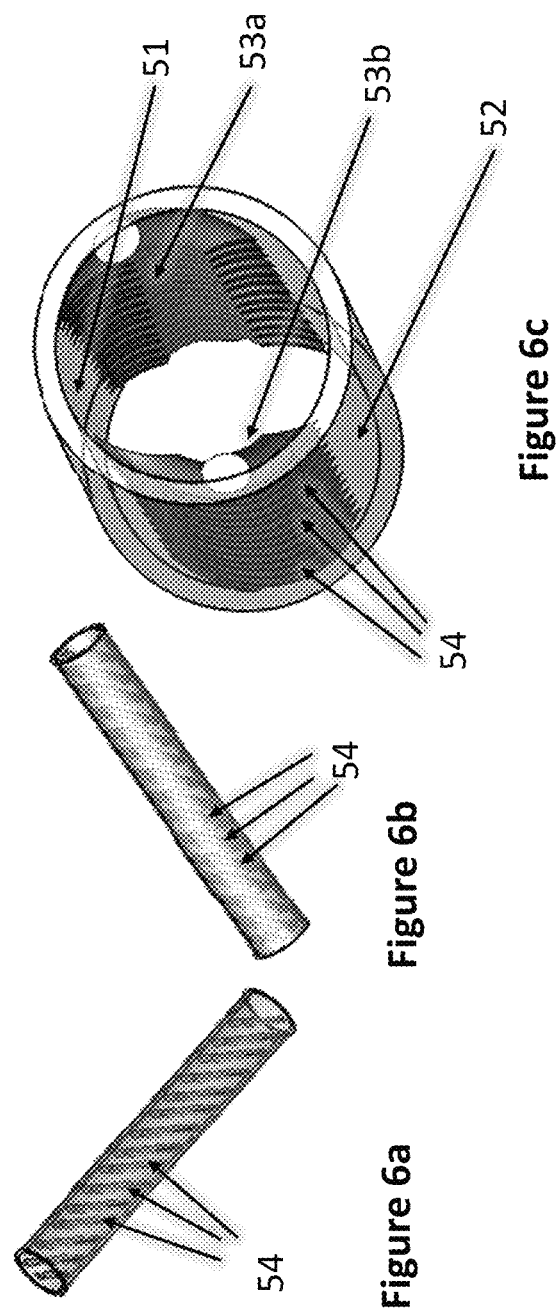

CONVERTIBLE LABORATORY CONDENSER

RELATED APPLICATION DATA

This application claims the priority benefit of U.S. Provisional Application Ser. No. 62/748,950, filed Oct. 22, 2018, which is hereby incorporated in its entirety herein by reference.

BACKGROUND OF INVENTION

Among equipment found in chemical laboratories and elsewhere are apparatus known as condensers used for condensing vapor into the liquid phase. Laboratory condensers typically comprise glass tubes with ends terminated in standard-joints or other connectors which allow intimate assembly with a variety of other glass apparatus and for a variety of purposes. Laboratory condensers may further comprise concentric tubular jackets, coiled tubing or cold fingers or combinations thereof—affording passages through which water is circulated to provide cooling to surfaces onto which vapors may condense. Some of the various designs of such water-cooled glass condensers are identified as West condensers, Allyn condensers, and Friedrich condensers. In addition to water cooling, laboratory condensers may be air-cooled or cooled with dry ice/acetone or cooled by other means.

The liquid formed in a laboratory condenser is typically directed in one of two directions: the liquid may be returned to the vessel from which it boiled-off/evaporated or the liquid may be directed to a separate container for collection. In the former case the condensing apparatus is known as a reflux condenser; in the latter case the condenser is typically described as part of a distillation apparatus. Some condenser units are suitable for either operation. For example, West condensers or Friedrich condensers may be connected vertically to boiling flasks for reflux operations or, alternatively, the same pieces of equipment may be appropriately combined with other glassware and thus used for distillation operations.

Occasionally, a single process may require reflux and distillation operations to be sequentially employed. For example, the process of drying and purifying a solvent may require first refluxing the solvent in the presence of a drying agent followed by distilling the solvent to separate it from the drying agent. Generally, for solvent drying/purifying processes both refluxing and distilling operations should be conducted under an anhydrous atmosphere and occasionally should be conducted under an inert atmosphere or under reduced pressure. For the combined solvent drying and distillation process dedicated apparatus known as solvent stills exist. Usually solvent stills are elaborate, fragile pieces of glassware with numerous valves and generally are dedicated solely to the combined process of drying and distillation of solvents.

OBJECTIVE OF THE INVENTION

A simple, relatively inexpensive, robust condensing apparatus is needed for use at times as a solvent still while at other times being employable for other routine laboratory reflux or distillations operations. A simple condenser apparatus, inexpensive enough to be semi-permanently installed at each of several student or researcher work stations and readily employable in either reflux or distillation mode without the need for additional apparatus may be expected to improve worker efficiency, save money and reduce glassware breakage. Such an apparatus should be facilely interchangeable between reflux and distillation operations without the need for disconnection and reconnection to other apparatus. Avoiding disconnection between operations allows maintenance of a continuous, internal, inert or reduced pressure atmosphere and thus may save time and may prevent deleterious exposure of materials to harmful atmospheres. A condenser apparatus facilely interchangeable between reflux and distillation while maintaining an inert or reduced pressure atmosphere may be useful for a variety of chemical processes such as: azeotropic water removal, solvent stripping following a reaction, recrystallization, cracking of dimers (such as dicyclopentadiene) and fractional distillation.

SUMMARY OF THE INVENTION

The present invention includes a laboratory condenser comprising a tube having a substantially straight section (typically substantially straight over the central ¾ of its length), mounted to a horizontal rod at an angle of about 10 to 90 degrees to the long axis of the horizontal rod (typically and preferably at an angle of about 40 degrees to the long axis of the horizontal rod); the first end of the central glass tube being nearest to the vertex of the angle.

The device is adapted to be interchangeable from functioning as a reflux condenser, when the tube is above the horizontal plane of the rod, to functioning as a distillation condenser as by inversion (such as rotation through an angle of about 180 degrees) that substantially inverts the tube, moving the tube to a position below plane of the horizontal rod.

The device may include a laboratory condenser comprising a tube being substantially straight over the central ¾ of its length and generally mounted to the horizontal rod at an angle of about 10 to 90 degrees to the long axis of the horizontal rod, but preferably at an angle of about 40 degrees to the long axis of the horizontal rod; with the first end of the central glass tube being nearest to the vertex of the define angle; the device consequently being adaptable and interchangeable from functioning as a reflux condenser, when the tube is above the horizontal plane of the rod, to functioning as a distillation condenser as rotation through an angle of 180 degrees substantially inverts the tube, moving the tube to a position below the plane of the horizontal rod.

In one embodiment, the device may comprise at least one bearing but preferably two bearings one or more bearings, with each having of the attached rods extending to external fixations; whereby the bearings holding the horizontal rod substantially fixed with respect to translational motion while allowing rotational motion of the horizontal rod about its long axis.

In another embodiment, the device has a first end bent at an angle of less than 90 degrees, such as about 40 degrees with respect to the substantially straight center ¾ length of the tube, thereby allowing the first end to engage with a substantially horizontal second tube.

In still another embodiment, the device may include a ball connector or a socket connector at its first end so as to be capable of engaging a horizontal tube in a ball-and-socket joint fashion.

In yet another embodiment, the device may comprise a 3-way stopcock valve at the second end of the tube disposed at an angle of less than 90 degrees, such as about 50 degrees with respect to the substantially straight center section of the tube, and such that the stopcock is disposed substantially perpendicular to the horizontal rod regardless of whether the the tube is positioned above or below the plane of the horizontal rod.

In another variation, the device may comprise either a male or female connecter, with or without a drip tip, of a standard tapered joint at the second end of the tube disposed at an angle less than 90 degrees, such as about 50 degrees with respect to the substantially straight center length of the tube and such that the connector is disposed substantially perpendicular to the horizontal rod regardless of whether the tube is positioned above or below the horizontal rod.

Other embodiments of the invention may include a cooling device, such as a water-cooled jacket, in one variation typically concentric with the center length of the substantially straight tube and larger in diameter than the substantially straight tube.

Still other embodiments of the invention may include a valve mechanism for reversing the flow of fluid through the condenser proper and thus obviating the need for deliberately disconnecting and substantially separating elements of the device. The valve mechanism may be substantially integrated with one of the bearings of the device or otherwise having a first part capable of rotating synchronously with the horizontal rod, while having a second part is substantially fixed, thereby allowing rotation of the first part relative to the second part and automatically, that is, without further action of the operator, effecting a reversal of the direction of fluid flow through the condenser proper as the condenser proper is inverted.

In other embodiments of the invention the device may comprise a substantially straight tube, the tube comprising substantially equal-volume quadrants as delimited by planes radiating from the centerline of the tube: an upper quadrant, a lower quadrant and two lateral quadrants; the two lateral quadrants comprise internal ribs or other internal projections into the tube's innermost lumen or bore as may serve to increase cooled surfaces onto which vapor may condense; the upper quadrant and lower quadrant being substantially free of ribs or other projections, thus allowing unobstructed downward flow of liquid along the length of the tube, whether the condenser proper is oriented above the horizontal rod or below the horizontal rod, that is, whether in use for reflux or for distillation.

In further embodiments of the invention the device may comprise ribs oriented substantially vertically when the condenser proper is mounted at certain preferred angles of between about 10 to 90 degrees to the horizontal, such as for instance at about 40° with respect to the horizontal rod; thereby promoting rapid run-off and clearing of condensed liquid from the condenser proper, whether the condenser proper is oriented above the horizontal plane of the horizontal rod or below the plane of the horizontal rod, that is, regardless of whether the condenser proper is in the reflux or distillation orientation.

Another variant of the invention is for the device to include a damping or retarding mechanism for slowing or temporarily fixing the rotation of the horizontal rod about its long axis and consequently also slowing the rotation of any attachments to the horizontal rod. Although any acceptable mechanism may function for this purpose, such a damping or retarding mechanism may be in the form of a rounded-cog sprocket wheel, slowed in its rotation by spring-loaded rollers which may temporarily lodge in the spaces between cogs in the sprocket wheel.

The present invention comprises a water-cooled, glass condenser (the condenser proper) mounted to a horizontal rod at an angle of 10 to 90 degrees to the horizontal, but preferably at an angle of about 40 degrees to the horizontal. The condenser is thus adaptable and interchangeable from functioning as a reflux condenser to functioning as a distillation condenser as rotation of the horizontal rod around its long axis through an angle of 180 degrees substantially inverts the attached condenser proper. When said rotation positions the condenser proper above the plane of the rod, the device functions as a reflux condenser. When rotation positions the condenser proper below plane of the rod, the device functions as a distillation bridge. The present invention further comprises an adapter tube. Intimate engagement of a ball connecter comprising the adapter tube with a socket connecter comprising the condenser proper establishes a ball-and-socket joint allowing rotation of the condenser proper relative to the adapter tube without substantial disconnection of the two. The present invention further comprises an automatic flow-reversing valve; providing for water to invariably enter the lower end of the condenser proper and to invariably exit the upper end of the condenser proper, regardless of whether the apparatus is in the reflux position or is inverted (flipped) into the distillation position. Flow-reversal is made to be automatic by attachment of the said valve to the said horizontal rod such that the valve's mechanism is rotated as the horizontal rod is simultaneously rotated. The invention further comprises a device to damp/retard the rotation of the said horizontal rod as well as the attached condenser proper, and further serves to hold the condenser proper at semi-fixed positions either above or below the plane of the horizontal rod.

BRIEF DESCRIPTION OF FIGURES

FIG. 2a. Front elevation view. The device is shown mounted in the reflux position, with the condenser proper positioned above the horizontal rod.

FIG. 2b. Front elevation view. After a 180-degree rotation the device is shown now mounted in the distillation position, with the condenser proper positioned below the horizontal rod. Note that the "water in" and "water out" ports have not changed position from FIG. 2a.

FIG. 3. Angled elevation view with the device in the distillation position, such that the condenser proper is positioned below the horizontal rod.

FIG. 5 Side elevation and oblique views of damping/retarding device is shown.

FIG. 6a. Front elevation view of ribbed condenser embodiment, with the device in distillation position is shown. Note that the ribs are substantially vertical.

FIG. 6b. Front elevation view of ribbed condenser embodiment, with the device in reflux position is shown. Note that the ribs are substantially vertical.

FIG. 6c. Slightly oblique view of the ribbed condenser embodiment is presented, showing the parallel ribs extending into the interior of the tube.

DETAILED DESCRIPTION OF INVENTION

Figure 1:
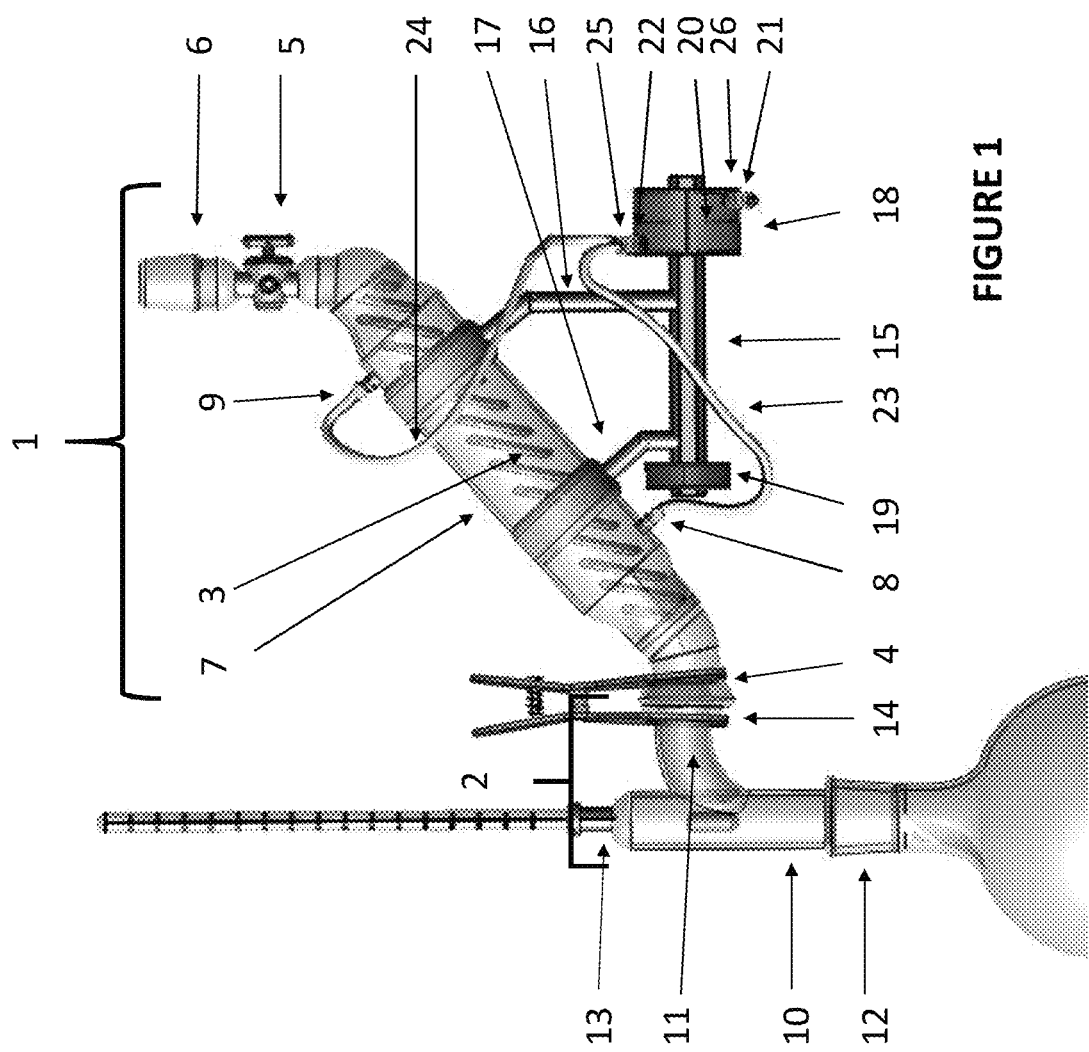
FIG. 1. Front elevation view showing the condenser proper 1 and the adapter tube 2. The device is shown mounted in the reflux position, with the condenser proper positioned above the horizontal rod.

The present invention and its constituent parts may be more clearly understood from inspection of FIG. 1 and FIGS. 2a and 2b. The present invention comprises the condenser proper 1 and the adapter tube 2. The condenser proper further comprises a central tube 3. The central tube is substantially straight along the center ¾ of its length, is typically constructed of glass and comprises a first end and a second end. The first end of the central tube is bent at an angle of about 40 degrees with respect to the substantially straight center section of the tube. Integrated with the first end is a socket connecter 4 of a ball-and-socket joint.

Integrated with the second end of the central glass tube is a 3-way stopcock valve 5 disposed at an angle of about 50 degrees with respect to the substantially straight center section of the tube and such that the stopcock is disposed substantially perpendicular to the horizontal rod when the straight section of the central glass tube is held at a 40 degree angle to the horizontal; the first end of the central glass tube being nearest to the vertex of the said 40 degree angle. Also, integrated with the second end of the central glass tube is the male section of a standard tapered joint 6 at an angle of about 50 degrees with respect to the substantially straight center section of the tube and consequently the male section of a standard tapered joint is disposed substantially perpendicular to the horizontal rod when the straight section of the central glass tube is held at a 40 degree angle to the horizontal; the first end of the central glass tube being nearest to the vertex of the said 40 degree angle The condenser proper further comprises a tubular jacket 7, substantially comprising a tube about 0.5 inches in diameter larger than the central glass tube and concentric with the central glass tube. Water or other cooling fluid may be circulated through the space between the tubular jacket and the central glass tube using the first glass port 8 and the second glass port 9 for fluid to enter or exit the space.

The adapter tube comprises a first tube 10 further comprising a first end and a second end as well as a second tube 11 also comprising a first end and a second end. Integrated with the first end of the first tube is a male connecter of a standard-taper joint 12. Integrated with the second end of the first tube is a thermometer adapter 13. The first end of the second tube is fused with the first tube substantially perpendicular to the first tube and near the center of the length of the first tube. The second end of the second tube comprises a ball connecter 14 which mates to the socket connecter comprising the condenser proper, together forming a ball-and-socket joint. Intimate engagement of said ball of the adapter tube with said socket of the condenser proper allows rotation of the condenser proper relative to the adapter tube while allowing the two to remain substantially joined and while maintaining an air-tight seal.

The present invention comprises the condenser proper mounted to a horizontal rod 15 at an angle of about 10 to 90 degrees to the horizontal, but preferably at an angle of about 40 degrees to the horizontal. The condenser proper is held fixed at the defined angle by a first bracket 17 attached to the horizontal rod, disposed about ¼ of the horizontal rod's length from its first end and a second bracket 16 attached to the horizontal rod and disposed about ¼ of the horizontal rod's length from its second end. Supporting the horizontal rod near its first end is a first bearing 18 which is externally fixed by rod 55 extending radially outward. Supporting the horizontal rod near its second end is a second bearing 19 which is externally fixed by a rod 44 extending radially outward. The first and second bearings hold the horizontal rod fixed with respect to its translational motion but allow rotational motion of the horizontal rod about its long axis. As may be more clearly understood from examination of FIG. 2a and FIG. 2b, the present invention is thus adaptable and interchangeable from functioning as a reflux condenser to functioning as a distillation condenser as rotation of the horizontal rod about its long axis through an angle of 180 degrees substantially inverts the attached condenser proper. When said rotation positions the condenser proper above the plane of the rod, the device functions as a reflux condenser. When rotation positions the condenser proper below plane of the rod, the device functions as a distillation bridge.

It will be appreciated by persons ordinarily skilled in the art that, in an efficient condenser, cooling water will fill a condenser jacket completely, rather than simply streaming along its interior walls. Consequently, the present invention further comprises an automatic flow-reversing valve 20, a device for insuring that water will invariably enter the lower end of the condenser proper and will invariably exit the upper end of the condenser proper regardless of whether the apparatus is in the reflux position or is inverted (flipped) into the distillation position. Flow-reversal is made to be automatic by integrating the valve mechanism into the first bearing such that part of the valve's mechanism is rotated as the horizontal rod is simultaneously rotated. Accordingly, in reflux position, water may enter first port 21 in the flow-reversing valve, exit the third port 22 and then pass through the first flexible hose 23 and into port 8 of the condenser proper. Exiting port 9 of the condenser proper, water passes through second hose 24 and again enters the flow-reversing valve through port 25 and then passes out of the flow-reversing valve through port 26.

Figure 4B:
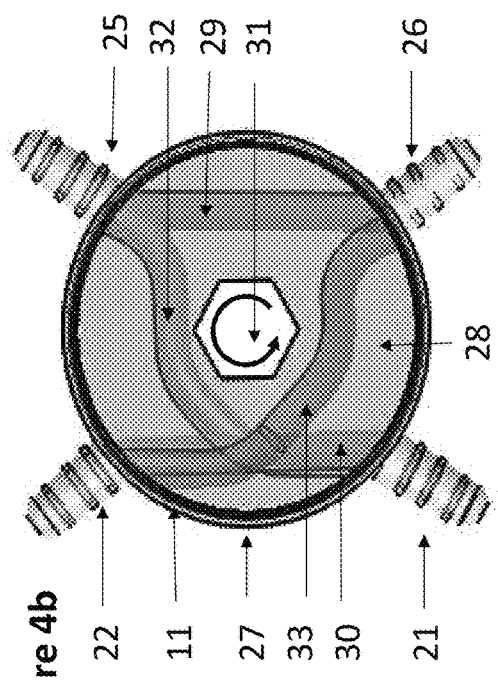
FIG. 4b. Side elevation view of automatic flow-reversing valve is shown. The alignment of the tubular channels of the inner cylinder connect port 1 with port 4 and connect port 2 with port 3 of the outer cylinder, insuring that water will be directed to enter the lower end of the condenser proper while in distillation operation.
Figure 4A:
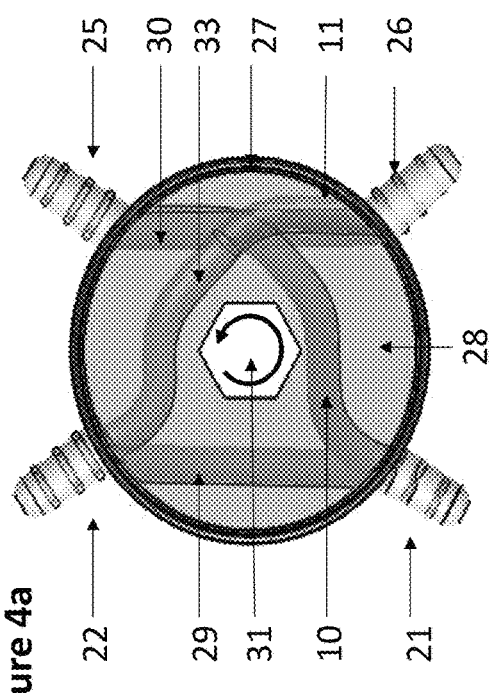
FIG. 4a. Side elevation view of automatic flow-reversing valve is shown. The alignment of the tubular channels of the inner cylinder connect port 1 with port 3 and connect port 2 with port 4 of the outer cylinder, insuring that water will be directed to enter the lower end of the condenser proper while in reflux operation.
Figure 4C:
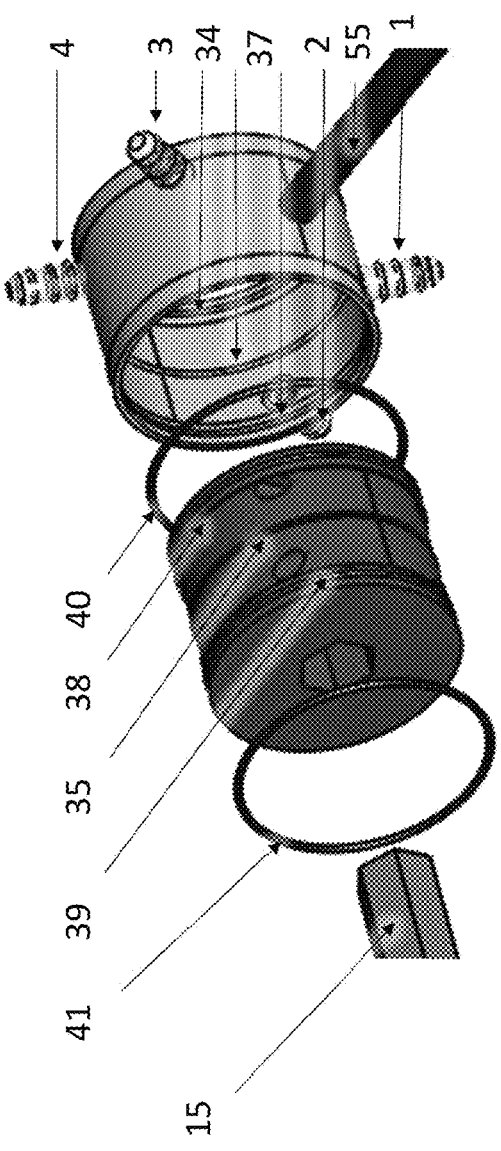
FIG. 4c. Exploded view of automatic flow-reversing valve is shown.

As will be more clearly understood from inspection of FIG. 4a, FIG. 4b, and FIG. 4c, the flow-reversing valve further comprises a hollow outer cylinder 27 about 0.5 to 3 inches in length and about 0.5 to 3 inches in outer diameter and an inner diameter about 0.1 to 0.5 inches less than the outer diameter. The outer cylinder comprises a first end and a second end. First port 21 and second port 26 for connection of tubing are attached near the first end of the outer cylinder. Third port 22 and fourth port 25 for connection of tubing are attached near the second end of the outer cylinder. The ports may further comprise hose barbs or other connecters for attaching flexible tubing. Concentric with the outer cylinder with a length approximately equal to the length of the outer cylinder and with an outer diameter approximately equal to the inner diameter of the outer cylinder is an inner cylinder 28. The inner cylinder is capable of rotation about a common axis relative to the outer cylinder. In one configuration a tubular channel 29 within the inner cylinder connects first port with third port and another tubular channel 30 connects second port with fourth port. The outer cylinder is attached by a rod 55 to an external support and thus remains fixed. The inner cylinder comprises a hollow core 31 which is splined or polygonal in cross-section or is otherwise is held fixed to the horizontal rod to which the condenser is also attached and together they can rotate about an axis defined by the long axis of the horizontal rod and thus the inner cylinder rotates relative to the outer cylinder. When the inner and outer cylinders are rotated relative to one another by an angle of 180 degrees, another configuration is established, whereby connections between first port and third port are disconnected and connections between second port and fourth port also are disconnected. Simultaneously, a tubular channel 32 within the inner cylinder connects first port with fourth port and a tubular channel 33 connects second port with third port.

The automatic flow-reversing valve further comprises a retaining ridge 34 integrated with the interior surface of the outer cylinder and running medial and circumferentially to the inner surface of the said outer cylinder. The inner cylinder comprises a retaining groove 35 disposed medially and circumferentially to the inner cylinder and capable of mating with the retaining ridge of the outer cylinder. At the first end of the outer cylinder is disposed the first outer O-ring channel 36 At the second end of the outer cylinder is disposed the second outer O-ring channel 37. At the first end of the inner cylinder is disposed the first inner O-ring channel 38. At the second end of the inner cylinder is disposed a second inner O-ring channel 39. First O-ring 40 and second O-ring 41 are constructed of elastomeric materials and are disposed in these channels at the first and second ends of the automatic flow reversing valve, functioning, in part, as water-tight seals. Other flow-reversing mechanisms may be known to those ordinarily skilled in the art and may be similarly employed for the function of insuring that water invariably enters the lower end of the condenser proper and exits the upper end of the condenser proper. It is important to emphasize that a key feature of the present invention is that the flow-reversal is automatic, that is, it is affected in a way that does not require any deliberate action by the operator other than rotating the condenser proper from reflux position to distillation position or rotating the condenser proper from distillation position to reflux position.

The present invention comprises a damping/retarding device 21 to slow the inversion of the condenser proper and to hold the condenser proper in certain semi-fixed positions either above or below the plane of the horizontal rod. The damping/retarding device may be more clearly understood by examination of FIG. 5. The rotation retarding device comprises a sprocket wheel 42 approximately 0.5 to 3 in in diameter and about 0.5 in in width, comprising a plurality of rounded cogs. The sprocket wheel is concentric with and attached to a horizontal rod to which the condenser proper is also fixed. Concentric with the sprocket wheel and about 0.5 to 1 in larger in diameter is a thin walled hollow cylinder, the shell cylinder 43. Attached to the side of the shell cylinder is the first end of a first bearing supporting rod 44 which extends in a radial direction from the center of the shell cylinder and its second end is fixed to an external support. The shell cylinder is comprised near its first end and second end with flat thin-walled disks, the first inner endcap 45a and the second inner endcap 45b. Cylindrical rollers such as 46a, 46b, 46c with diameters approximately equal to the width of the spaces between sprocket cogs are disposed around the sprocket wheel with their axles parallel with the axle of the sprocket wheel. Small rods such as 47a, 47b, 47c comprise the axles of each of the rollers. The ends of the axles extend through slots such as 48a, 48b, 48c in first inner endcap and others in the second inner endcap. The width of each of the slots is slightly larger than diameter of the roller axles and the length of each slot is approximately equal to the diameter of each roller. The slots extend radially along a line connecting the center of the sprocket wheel axis to the edge of the shell cylinder. For each roller is provided two small coiled springs from a plurality of coiled springs exemplified by 49a, 49b, 49c. First ends of ½ of the plurality of coiled springs are attached to the first ends of the roller axles as the said axles extend through the slots in the first inner endcap. The first ends of the other ½ of the plurality of coiled springs are attached to second ends of roller as the said axles extend through the slots in the second inner endcaps. The second ends of the said springs are attached to fixed projections on the inner endcaps or are otherwise held in tension. Enclosing the springs are flat disks, the first outer endcap 50a and the second outer endcap 50b. Other damping or retarding mechanisms based upon friction, hydraulics, pneumatics, electromagnetics or other principles may be known to those ordinarily skilled in the art and may be substituted for the specific damping/retarding mechanism described herein.

As will be appreciated by persons ordinarily skilled in the art, an efficient condenser design provides an abundance of surface area for condensation to occur. Therefore, one embodiment of the present invention comprises a ribbed design for the condenser-proper. The ribbed condenser embodiment may be more clearly understood from inspection of FIG. 6a, FIG. 6b, and FIG. 6c. This embodiment comprises a hollow cylindrical tube, approximately 0.5 in. to 4 in. in diameter but preferably about 1.5 in. in diameter. The said tube comprises substantially equal-volume quadrants as delimited by planes radiating from the centerline of the tube: an upper quadrant 51 a lower quadrant 52 and two lateral quadrants 53a, 53b. The two lateral quadrants comprise ribs 54 approximately ⅛ in. to ½ in. in diameter and spaced approximately ¼ in to 3 in. apart. The ribs comprise projections into the interior space of the tube as may be formed by attaching pieces of glass to the inside of the tube or as formed by a plurality of indentations pressed into heat-soften glass or by other manufacturing processes known to those ordinarily skilled in the art. The said lateral ribs may serve to increase cooled surfaces onto which vapor may condense. When the condenser proper is mounted at the preferred angle of about 40 degrees with respect to the horizontal rod, the ribs become oriented substantially vertically, promoting rapid run-off and clearing of condensed liquid from the ribs. The upper quadrant and lower quadrant are substantially free of ribs or other projections, thus allowing unobstructed downward flow of liquid along the length of the tube, whether the condenser is in use for reflux or for distillation. Examination of FIG. 6c will more clearly show that when the condenser proper inverts, the upper quadrant becomes the lower quadrant and vise-versa.

What is claimed:

1. A device comprising a laboratory condenser wherein the laboratory condenser comprises:
    a central glass tube having a length and a first end, said tube being substantially straight over the central ¾ of said length, and
    a horizontal rod having a long axis;
    said tube mounted to said horizontal rod at an angle of about 10 to 90 degrees to the long axis of said horizontal rod; said first end of said central glass tube being nearest to the vertex of said angle;
    said device consequently being adaptable and interchangeable from functioning as a reflux condenser, when said central glass tube is above the horizontal plane of said rod, to functioning as a distillation condenser as rotation through an angle of 180 degrees substantially inverts said tube, moving the tube to a position below a plane of said horizontal rod, when said substantially straight central length of said central glass tube is extended into a water-cooled jacket.

2. The device according to claim 1 wherein said tube is mounted to said horizontal rod at an angle of about 40 degrees to the long axis of the horizontal rod; the first end of the central glass tube being nearest to the vertex of said 40 degree angle; the device consequently being adaptable and interchangeable from functioning as a reflux condenser, when the tube is above the horizontal plane of the rod, to functioning as a distillation condenser as rotation through an angle of 180 degrees substantially inverts the tube, moving the tube to a position below the plane of the horizontal rod.

3. The device according to claim 1 comprising one or more bearings, each having attached rods extending to external fixations; said bearings holding said horizontal rod, having a long axis, substantially fixed with respect to translational motion while allowing rotational motion of said horizontal rod about said long axis.

4. The device according to claim 2, said first end of said central glass tube being bent at an angle of about 40 degrees with respect to said substantially straight central length of said central glass tube, thereby allowing said first end adapted to engage with a substantially horizontal second tube.

5. The device according to claim 1, further comprising a ball connector or a socket connector at said first end of said central glass tube, so as to render it capable of functioning in a ball-and-socket joint.

6. The device according to claim 2, said central glass tube having a second end disposed at an angle of about 50 degrees with respect to the substantially straight center section of said central glass tube, and comprising a 3-way stopcock valve at said second end of the tube such that the stopcock valve is disposed substantially perpendicular to the horizontal rod regardless of whether said central glass tube is positioned above or below said plane of the horizontal rod.

7. The device according to claim 2 comprising either a male or female connecter, with or without a drip tip, of a standard tapered joint at the second end of the tube disposed at an angle of about 50 degrees with respect to the substantially straight center length of the tube and such that the connector is disposed substantially perpendicular to the horizontal rod regardless of whether the tube is positioned above or below the horizontal rod.

8. The device according to claim 1 additionally comprising a condenser that comprises a water-cooled jacket concentric with the said length of said substantially straight center section of said central glass tube and larger in diameter than said substantially straight center section of said central glass tube, said water-cooled jacket adapted to conduct a fluid flow therethrough.

9. The device according to claim 8 comprising a valve adapted to reverse said flow of fluid through said water-cooled jacket, and thus obviate the need for deliberately disconnecting and substantially separating elements of the device.

10. The device according to claim 9, additionally comprising bearings substantially integrated with said valve.

11. The device according to claim 1 additionally comprising a condenser that comprises a substantially straight tubular portion; said tubular portion having an innermost lumen or bore, and comprising substantially equal-volume quadrants as delimited by planes radiating from the centerline of said tubular portion, so as to define: an upper quadrant, a lower quadrant and two lateral quadrants; the two lateral quadrants comprising internal ribs or other internal projections into said tubular portion's innermost lumen or bore; the upper quadrant and lower quadrant being substantially free of ribs or other projections, thus allowing unobstructed downward flow of liquid along the length of said tubular portion, whether said condenser is oriented above said horizontal rod or below said horizontal rod.

12. The device according to claim 11 wherein said comprising ribs are oriented substantially vertically when said condenser is mounted at angle of between about 10 to 90 degrees to the horizontal.

13. The device according to claim 1 comprising a damper adapted to slow or temporarily fix the rotation of the horizontal rod about said long axis thereof.

14. The device according to claim 13 wherein said damper comprises a rounded-cog sprocket wheel, adapted to be slowed in its rotation by spring-loaded rollers which may temporarily lodge in the spaces between cogs in the sprocket wheel.

* * * * *